(12) United States Patent
Parker et al.

(10) Patent No.: US 9,778,410 B2
(45) Date of Patent: Oct. 3, 2017

(54) LIGHTING ASSEMBLY WITH ADJUSTABLE LIGHT OUTPUT

(75) Inventors: Jeffrey R. Parker, Richfield, OH (US); Timothy A. McCollum, Avon Lake, OH (US); Fumitomo Hide, San Jose, CA (US); Alexey Titov, Sagamore Hills, OH (US); Ian Hardcastle, Sunnyvale, CA (US)

(73) Assignee: Rambus Delaware LLC, Brecksville, OH (US)

( * ) Notice: Subject to any disclaimer, the term of this patent is extended or adjusted under 35 U.S.C. 154(b) by 0 days.

(21) Appl. No.: 13/420,893

(22) Filed: Mar. 15, 2012

(65) Prior Publication Data
US 2012/0236530 A1 Sep. 20, 2012

Related U.S. Application Data

(60) Provisional application No. 61/454,228, filed on Mar. 18, 2011, provisional application No. 61/453,745, (Continued)

(51) Int. Cl.
*G02B 6/00* (2006.01)
*F21V 8/00* (2006.01)

(52) U.S. Cl.
CPC ............ *G02B 6/0058* (2013.01); *G02B 6/005* (2013.01); *G02B 6/0035* (2013.01)

(58) Field of Classification Search
CPC .................. F21V 14/085; F21V 14/08; G02B 6/005–6/0056
(Continued)

(56) References Cited

U.S. PATENT DOCUMENTS

| 5,136,480 A | 8/1992 | Pristash .......................... 362/31 |
| 6,528,937 B1 | 3/2003 | Van Gorkom ................ 313/485 |

(Continued)

FOREIGN PATENT DOCUMENTS

| JP | 06222363 | 8/1994 | |
| JP | 2002-237203 | 8/2002 | ................ F21S 2/00 |
| KR | 2010-130731 | 12/2010 | ................ F21V 9/10 |

OTHER PUBLICATIONS

International Search Report and Written Opinion of the International Searching Authority re PCT/US2012/029181 issued Mar. 15, 2012 mailed Sep. 27, 2012. 9 pages.
(Continued)

*Primary Examiner* — Sean Gramling
*Assistant Examiner* — Gerald J Sufleta, II
(74) *Attorney, Agent, or Firm* — Renner, Otto, Boisselle & Sklar, LLP

(57) ABSTRACT

A lighting assembly includes a light guide to propagate light by total internal reflection and having a light output region on a major surface thereof. The lighting assembly also includes an optical adjuster having a major surface juxtaposed with and conforming to the light guide's major surface. The optical adjuster has a first region and a second region, the first region having a light modifying characteristic. The optical adjuster and light output region are variably positionable relative to one another to selectively apportion light emitted from the light output region between the first region and the second region. In this way, light apportioned to the first region is modified by the light modifying characteristic so that light output from the lighting assembly is modified based on relative positioning of the optical adjuster and the light guide.

32 Claims, 12 Drawing Sheets

Related U.S. Application Data filed on Mar. 17, 2011, provisional application No. 61/597,867, filed on Feb. 13, 2012.

(58) Field of Classification Search
USPC .................. 362/617–620, 623–626, 627
See application file for complete search history.

(56) References Cited

U.S. PATENT DOCUMENTS

| | | | | |
|---|---|---|---|---|
| 7,161,313 | B2 | 1/2007 | Piepgras et al. | 315/318 |
| 7,223,007 | B1 | 5/2007 | Fredley et al. | 362/616 |
| 7,331,681 | B2 | 2/2008 | Pohlert et al. | 362/18 |
| 7,651,243 | B2 | 1/2010 | McGuire, Jr. et al. | 362/293 |
| 7,663,733 | B2 | 2/2010 | Glent-Madsen et al. | 355/53 |
| 7,665,865 | B1 * | 2/2010 | Hulse | F21K 9/56 |
| | | | | 362/277 |
| 7,806,538 | B2 | 10/2010 | Ajiki et al. | 362/19 |
| 2007/0263388 | A1 | 11/2007 | Lai et al. | 362/287 |
| 2009/0091915 | A1 | 4/2009 | Eriksson | 362/84 |
| 2009/0103166 | A1 * | 4/2009 | Khazeni et al. | 359/290 |
| 2009/0103293 | A1 | 4/2009 | Harbers et al. | 362/231 |
| 2009/0323306 | A1 * | 12/2009 | Son | F21V 9/16 |
| | | | | 362/84 |
| 2010/0033948 | A1 * | 2/2010 | Harbers et al. | 362/84 |
| 2010/0046058 | A1 * | 2/2010 | Wang et al. | 359/237 |
| 2010/0231869 | A1 | 9/2010 | Cheng et al. | |
| 2010/0246158 | A1 | 9/2010 | Van Gorkom et al. | 362/19 |
| 2010/0315810 | A1 | 12/2010 | Tseng | 362/234 |
| 2010/0321931 | A1 | 12/2010 | McDermott | 362/190 |
| 2010/0328632 | A1 * | 12/2010 | Kurosaki et al. | 353/98 |
| 2011/0013389 | A1 * | 1/2011 | Willemsen et al. | 362/231 |
| 2011/0026260 | A1 * | 2/2011 | Ko | 362/285 |
| 2011/0188228 | A1 * | 8/2011 | Li | 362/84 |
| 2011/0234076 | A1 | 9/2011 | Simon et al. | |
| 2011/0291560 | A1 * | 12/2011 | Wang et al. | 315/32 |

OTHER PUBLICATIONS

Supplementary European Search Report from corresponding Application No. EP12757905, mailed on Jul. 11, 2014.

PCT International Preliminary Report on Patentability for related International Application No. PCT/US2012/029181 dated Sep. 26, 2013.

* cited by examiner

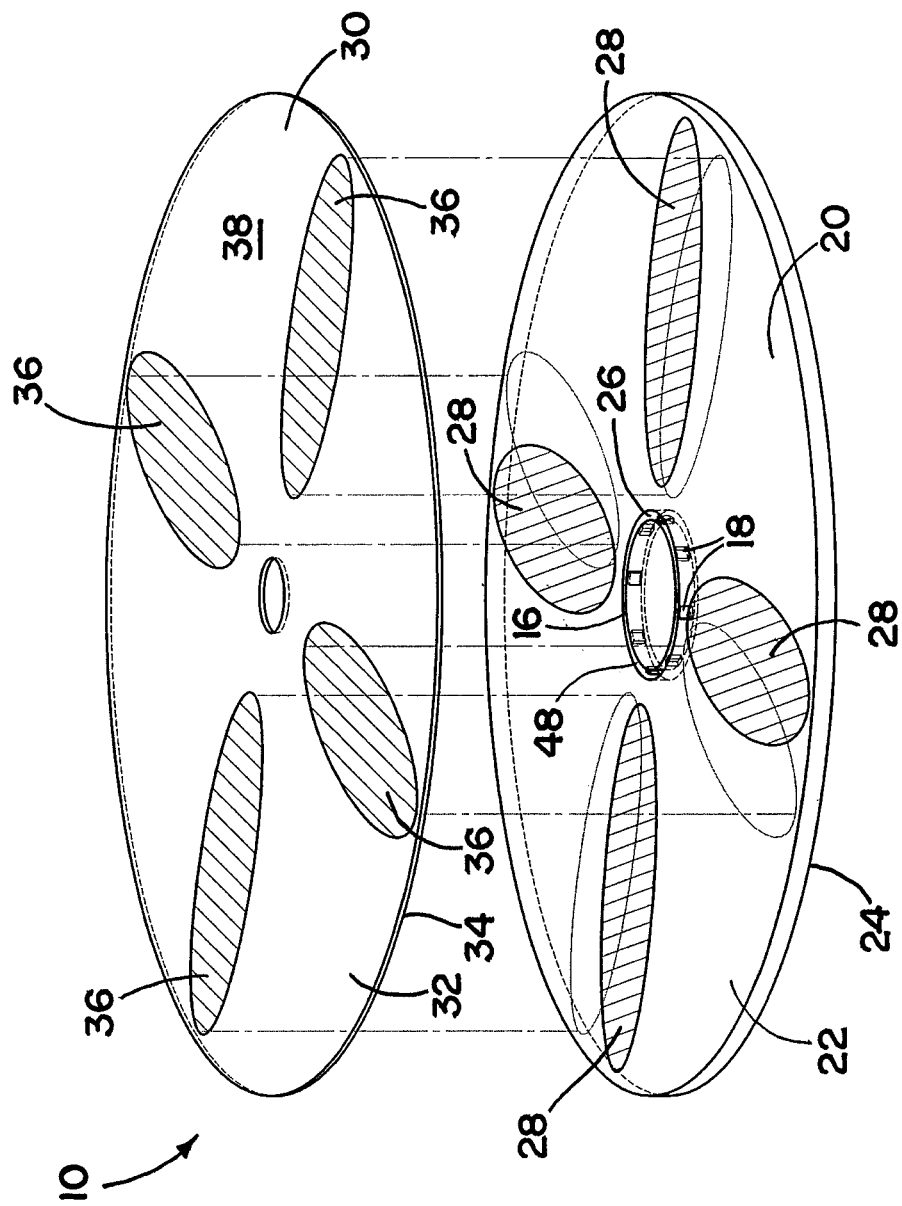

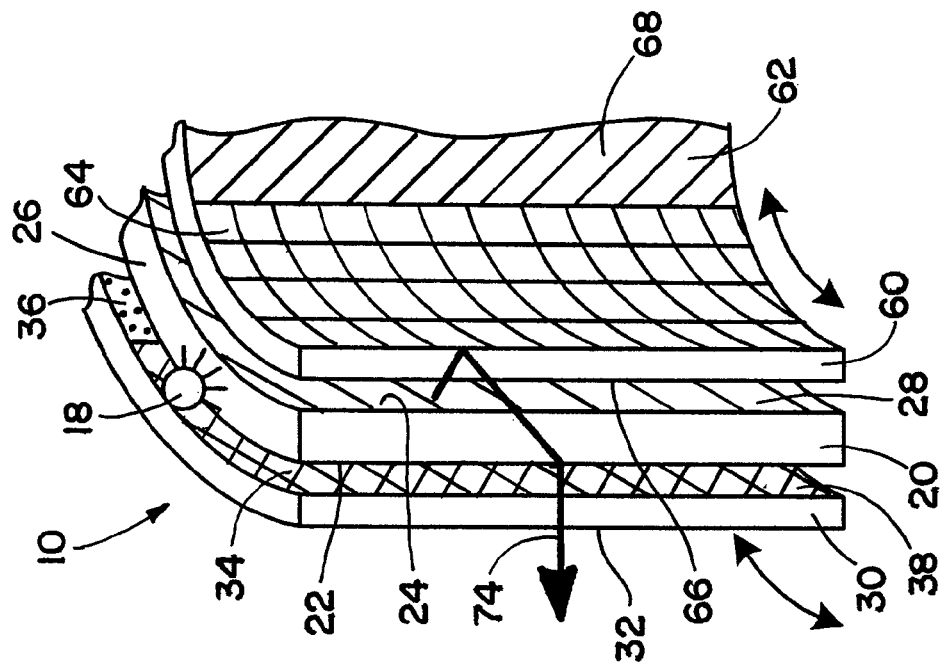
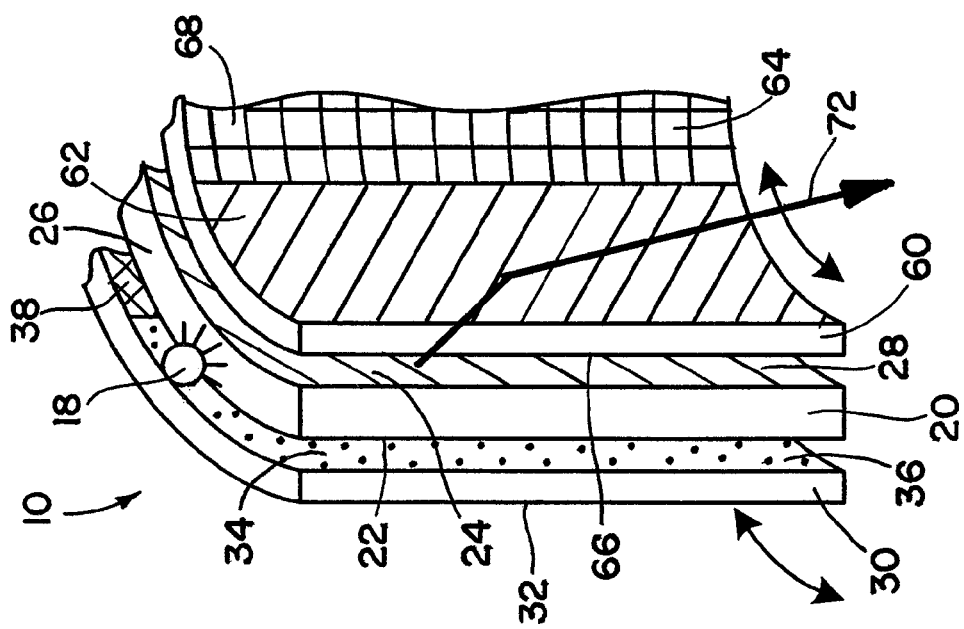
FIG. 8B
FIG. 8C

LIGHTING ASSEMBLY WITH ADJUSTABLE LIGHT OUTPUT

RELATED APPLICATION DATA

This application claims the benefit of U.S. Provisional Patent Application Nos. 61/453,745 (filed Mar. 17, 2011), 61/454,228 (filed Mar. 18, 2011), and 61/597,867 (filed Feb. 13, 2012), the disclosures of which are incorporated herein by reference in their entireties.

BACKGROUND

Energy efficiency has become an area of interest for energy consuming devices. One class of energy consuming devices is lighting devices. Light emitting diodes (LEDs) show promise as energy efficient light sources for lighting devices. But control over color and light output distribution is an issue for lighting devices that use LEDs or similar light sources.

BRIEF DESCRIPTION OF THE DRAWINGS

FIGS. 6A-6C are exploded views showing parts of embodiments of a lighting assembly having adjustable light output;

FIGS. 8B and 8C are partial cross-sectional views of the lighting assembly of FIG. 8A when configured to direct light from the lighting assembly in respective directions.

DETAILED DESCRIPTION

Figure 1:
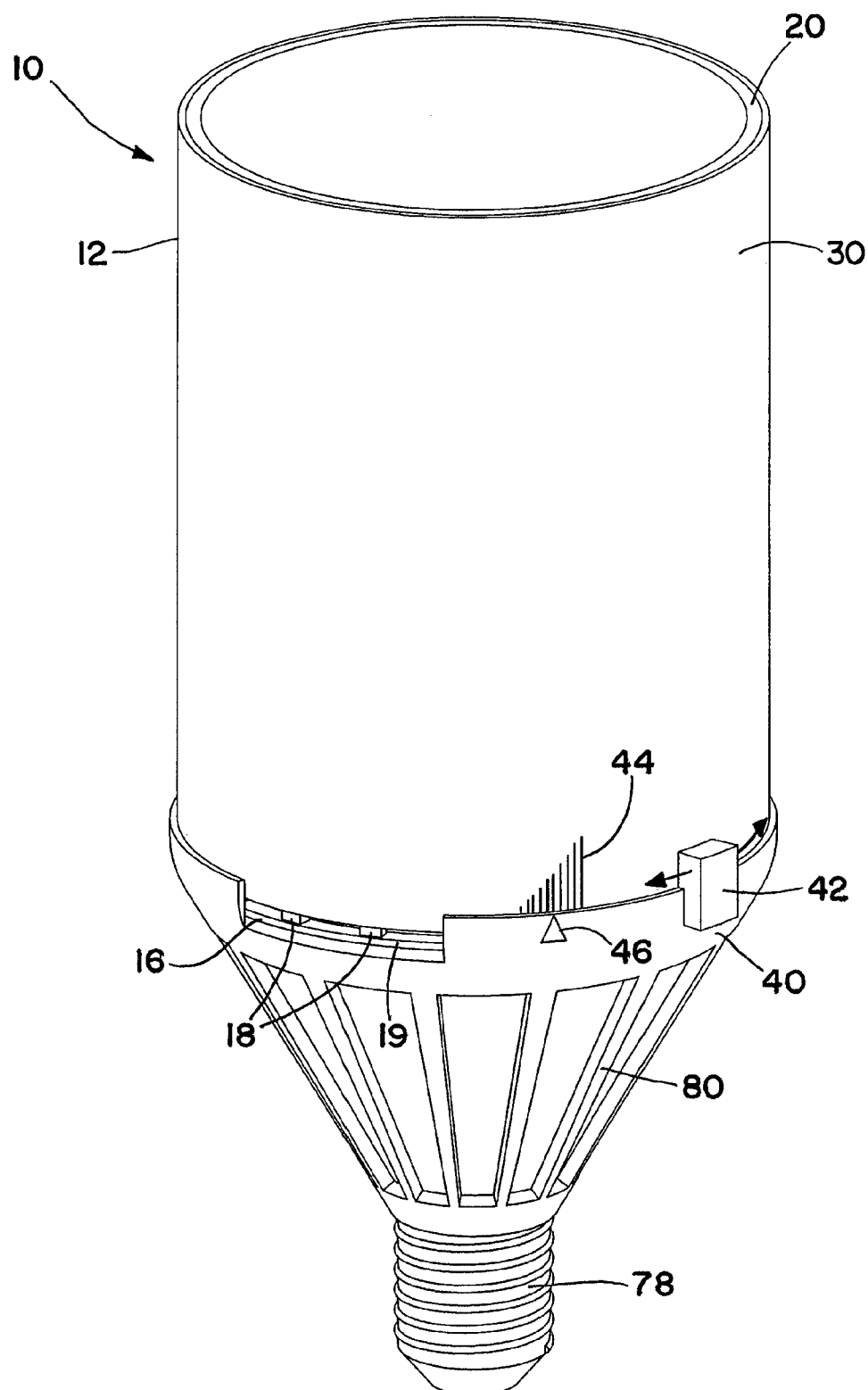
FIG. 1 is a schematic view of a light bulb representing an exemplary lighting assembly with adjustable light output, where a portion of a housing of the light bulb is cut away to show a light source assembly.

Embodiments will now be described with reference to the drawings, wherein like reference numerals are used to refer to like elements throughout. The figures are not necessarily to scale. Features that are described and/or illustrated with respect to one embodiment may be used in the same way or in a similar way in one or more other embodiments and/or in combination with or instead of the features of the other embodiments.

Figure 2:
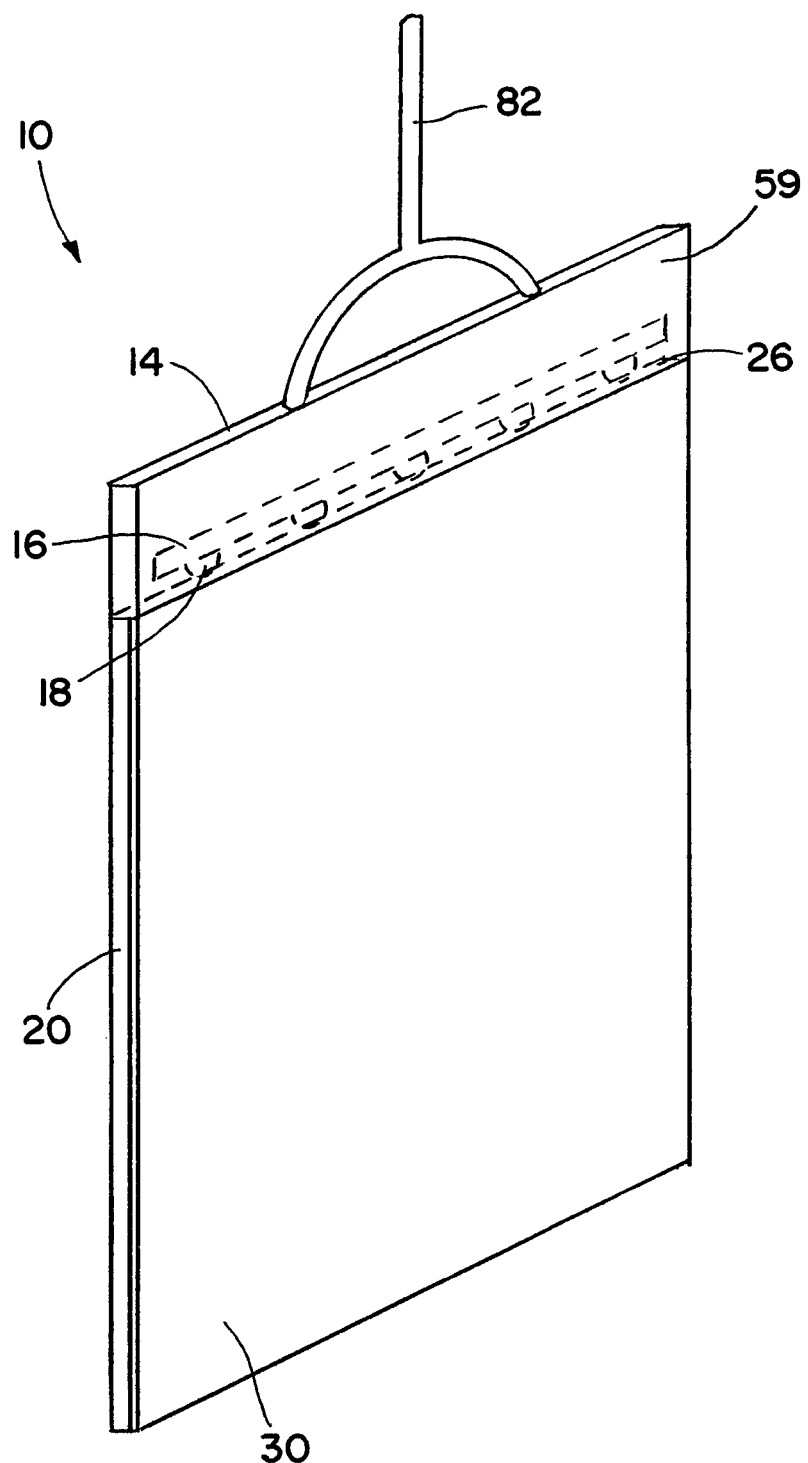
FIG. 2 is a schematic view of a lighting fixture representing another exemplary lighting assembly with adjustable light output.

Aspects of this disclosure relate to a lighting assembly. As illustrated in FIG. 1, one type of lighting assembly 10 is a light bulb 12. As illustrated in FIG. 2, another type of lighting assembly 10 is a lighting fixture 14.

As described in greater detail below, the lighting assembly includes a light guide to propagate light by total internal reflection. The light guide has a light output region on a major surface thereof. The lighting assembly also includes an optical adjuster having a major surface juxtaposed with and conforming in surface contour to the major surface of the light guide. The optical adjuster has a first region and a second region, the first region having a light modifying characteristic. The optical adjuster and the light output region of the light guide are variably positionable relative to one another to selectively apportion light emitted from the light output region between the first region and the second region. In this way, the light apportioned to the first region is modified by the light modifying characteristic thereof so that a characteristic of the light output from the lighting assembly is modified based on the relative positioning of the optical adjuster and the light output region.

In the case of the light bulb 12, the light bulb 12 additionally includes a base configured to mechanically mount the light bulb and receive electrical power.

With additional reference to FIG. 3, the lighting assembly 10, whether a bulb 12, a lighting fixture 14, or another type of lighting device, will be described in greater detail. The lighting assembly 10 includes a light source assembly 16. The light source assembly 16 includes one or more light sources 18. Each light source 18 is typically embodied as one or more solid-state devices. In one embodiment, the light sources 18 are mounted to a printed circuit board (PCB) 19 (FIG. 1).

Exemplary light sources 18 include solid state devices such as LEDs, laser diodes, and organic LEDs (OLEDs). In an embodiment where the light source 18 is one or more LEDs, the LEDs may be top-fire LEDs or side-fire LEDs, and may be broad spectrum LEDs (e.g., emit white light) or LEDs that emit light of a desired color or spectrum (e.g., red light, green light, blue light, or ultraviolet light). In one embodiment, the light source 18 emits light with no operably-effective intensity at wavelengths greater than 500 nanometers (nm) (i.e., the light source 18 emits light at wavelengths that are predominantly less than 500 nm). Although not specifically illustrated, the light source assembly 16 also includes structural components (e.g., PCB 19) to retain the light sources 18. The light source assembly 16 may additionally include: circuitry, power supply and/or electronics for controlling and driving the light sources 18, a heat sink, and any other appropriate components.

Figure 7:
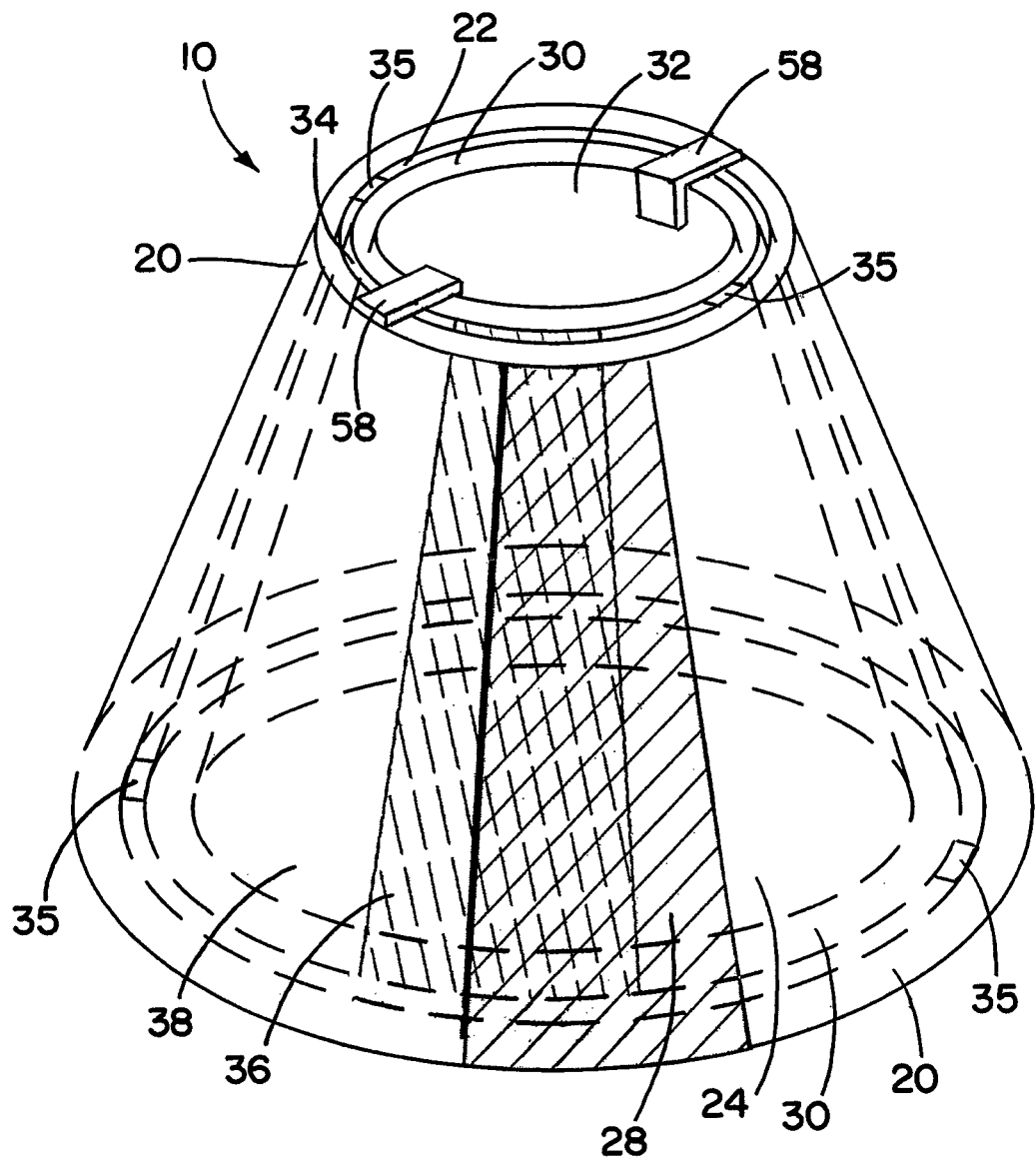
FIG. 7 is a schematic view showing part of an embodiment of a lighting assembly having adjustable light output.
Figure 8A:
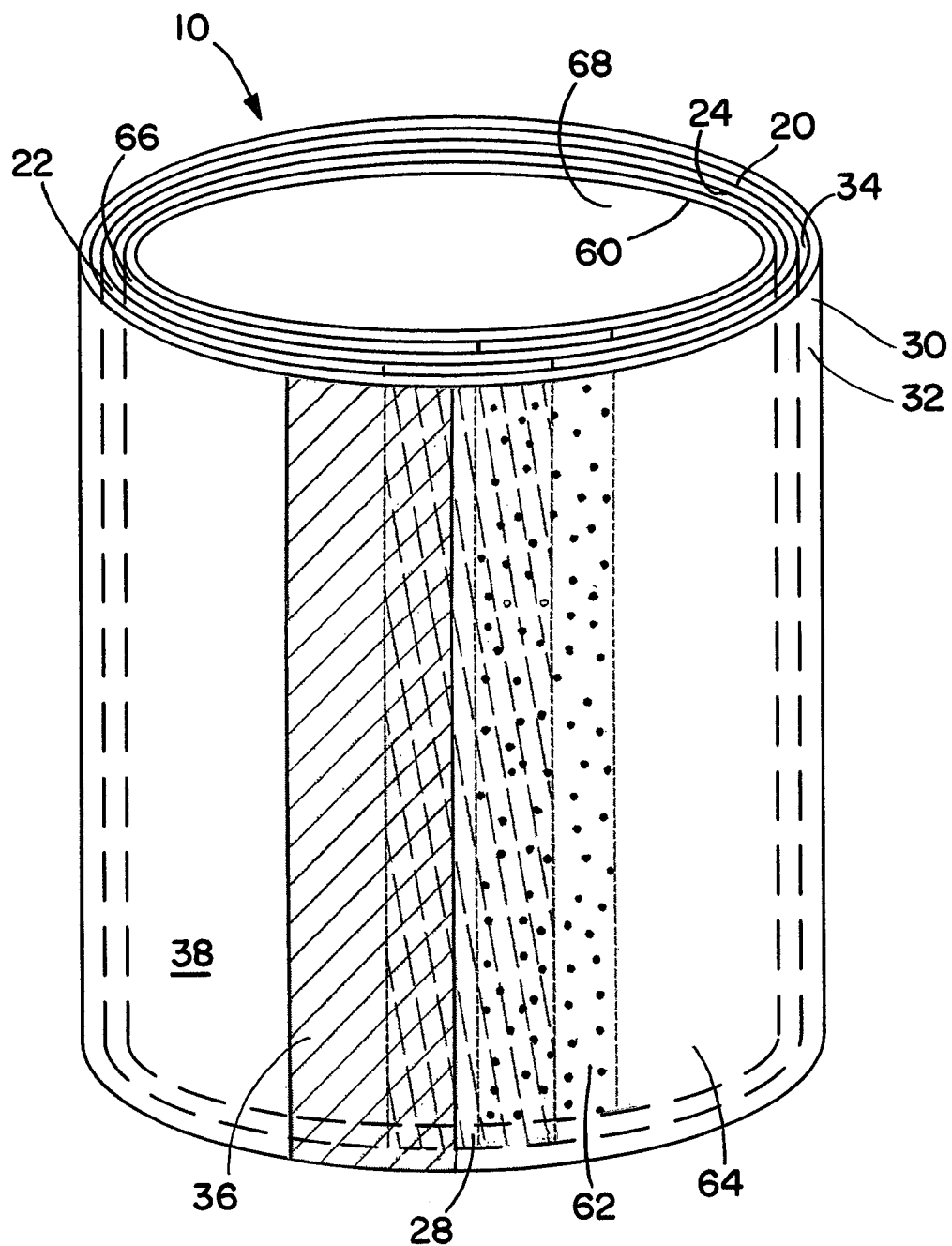
FIG. 8A is a schematic view showing part of an embodiment of a lighting assembly having adjustable light output.

The lighting assembly 10 also includes a light guide 20. Light from the light sources 18 is input into the light guide 20. The light guide 20 is a solid article made from, for example, acrylic, polycarbonate, glass, or another appropriate material. The light guide 20 also may be a multi-layer light guide having two or more layers. The light guide 20 has opposed major surfaces 22 and 24. Depending on the configuration of the light guide 20, the light guide has at least one edge. For instance, in a case where the light guide 20 is shaped like a dome, the light guide has one edge. In a case where the light guide 20 is a hollow cylinder (e.g., as shown in FIGS. 1 and 8A), is frustroconical (e.g., as shown in FIG. 7), is a frustrated pyramid, is a dome with a hole cut at the dome's apex, or another similar shape, the light guide has two opposed edges. Other light guide 20 shapes for either a light bulb 12 or a lighting fixture 14 are possible, such as a globe or a shape approximating the bulbous shape of a conventional incandescent bulb. In one embodiment, a light bulb configuration or a lighting fixture configuration may be established using planar or curved light guides 20 that are arranged in a three-dimensional geometric (e.g., polygonal) configuration. In the case where the light guide 20 is rectangular (e.g., as shown in FIGS. 2 and 3), the light guide 20 has four edges. Other geometries for the light guide 20 result in a corresponding number of edges. Depending on the geometry of the light guide 20, each edge may follow a straight path or a curved path, and adjacent edges may meet at a vertex or join in a curve.

One of the light guide edges serves as a light input edge 26. In some embodiments, the light input edge 26 is an external edge of the light guide 20 (e.g., as shown in FIGS. 1-5 and 7-9). In another embodiment, the light input edge 26 is an internal edge of the light guide 20, which is an edge completely surrounded by the light guide 20 and is usually an edge of a hole 48 that extends between the major surfaces of the light guide 20 (e.g., as shown in FIG. 6A). Light output from the light sources 18 is directed toward the light input edge 26. Additional optical elements (e.g., lenses, reflectors, etc.) may be present to assist in inputting the light into the light guide 20. Once input into the light guide 20, the light propagates through the light guide by total internal reflection (TIR) at the opposed major surfaces 22, 24. For purposes of this disclosure, any light input surface of the light guide 20 is considered a light input edge, even if it is located on one of the major surfaces 22, 24 or forms part of a light turning and/or homogenizing structure to introduce light between the major surfaces 22, 24 in a manner that allows the light to propagate along the light guide 20 by total internal reflection at the major surfaces 22, 24.

Length and width dimensions of each of the major surfaces 22, 24 are much greater than, typically ten or more times greater than, the thickness of the light guide 20. For instance, in the rectangular embodiment shown in FIG. 2, the length (measured from the light input edge 26 to an opposite edge distal the light input edge 26) and the width (measured along the light input edge 26) of the light guide 20 are both much greater than the thickness of the light guide 20. The thickness is the dimension of the light guide 20 in a direction orthogonal to the major surfaces. The thickness of the light guide 20 may be, for example, about 0.1 millimeters (mm) to about 10 mm. The light guide 20 may be rigid or flexible.

The light guide 20 includes light extracting elements in or on at least one of the major surfaces 22, 24. Light extracting elements that are in or on a major surface 22, 24 will be referred to as being "at" the major surface 22, 24. Each light extracting element functions to disrupt the total internal reflection of the propagating light that is incident on the light extracting element. In one embodiment, the light extracting elements reflect light toward the opposing major surface so that the light exits the light guide 20 through the opposing major surface. Alternatively, the light extracting elements transmit light through the light extracting elements and out of the major surface 22, 24 of the light guide 20 having the light extracting elements. In another embodiment, both of these types of light extracting elements are present. In yet another embodiment, the light extracting elements reflect some of the light and refract the remainder of the light incident thereon. Therefore, the light extracting elements are configured to extract light from one or both of the major surfaces 22, 24.

A light output region 28 may occupy part or all of one or both of the major surfaces 22, 24. In the example shown in FIG. 3, multiple instances of light output region 28 occupy part of the major surface 22. In the example shown in FIG. 9, a single light output region 28 occupies the entire major surfaces 22, 24.

Figure 3:
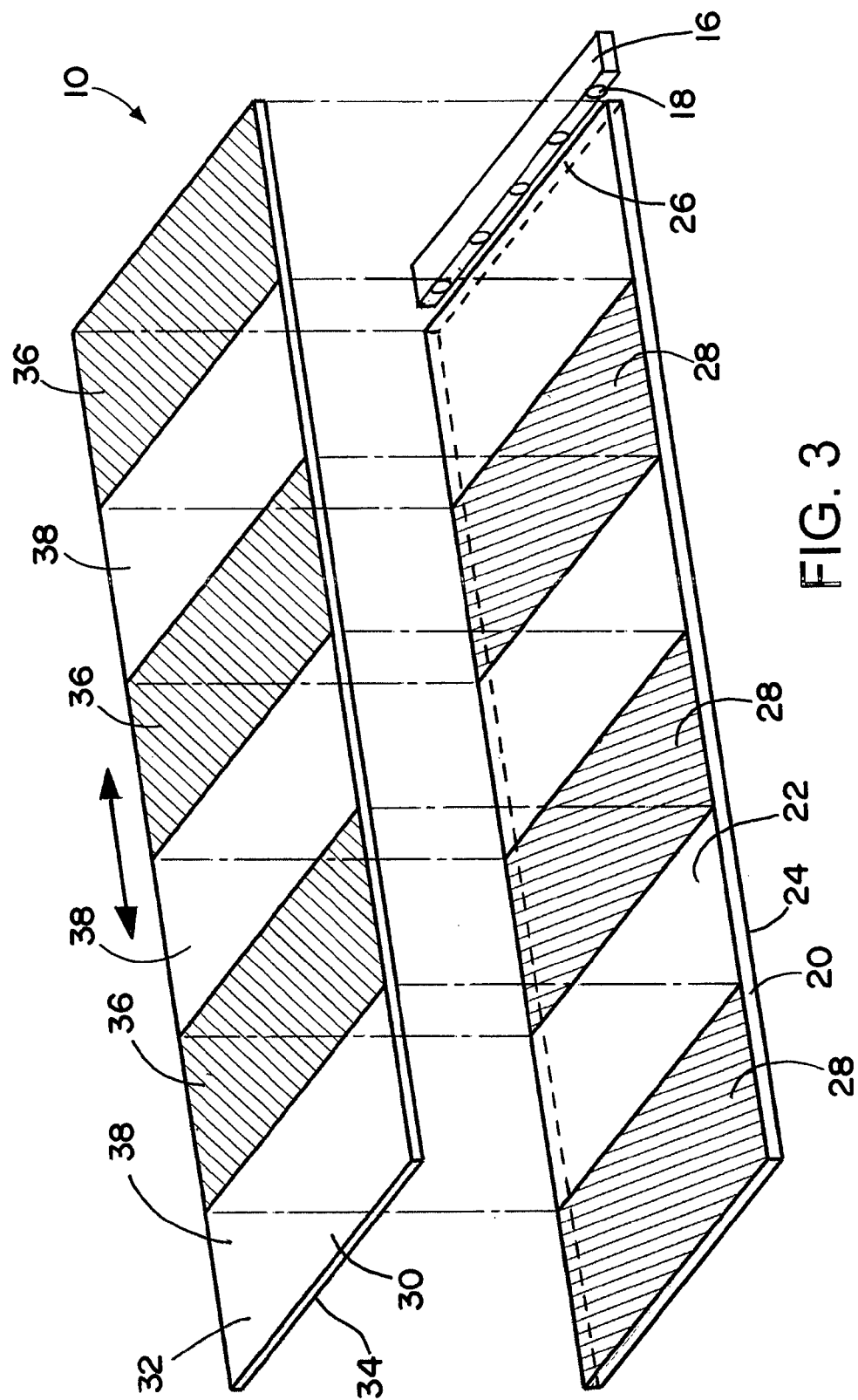
FIGS. 3-5 are exploded views showing part of an embodiment of a lighting assembly having adjustable light output.

In the example shown in FIG. 3, the light extracting elements are arranged in a pattern to form a number of distinct and spaced-apart light output regions 28, each of which emits light from one or both of the major surfaces 22, 24. For purposes of illustration, each light output region 28 is denoted in the appended figures by hatching shown on the portion of the major surface 22, 24 through which light is emitted.

The light extracting elements for each light output region 28 may be at one or both of the major surface 22, 24 through which light is emitted, or at the opposite major surface 22, 24. Light guides having such light extracting elements are typically formed by a process such as stamping, molding, embossing, extruding, laser etching, chemical etching, or another suitable process. Light extracting elements may also be produced by depositing elements of curable material on the light guide 20 and curing the deposited material using heat, UV-light or other radiation. The curable material can be deposited by a process such as printing, ink jet printing, screen printing, or another suitable process. Alternatively, the light extracting elements may be inside the light guide between the major surfaces 22, 24 (e.g., the light extracting elements may be light redirecting particles and/or voids disposed in the light guide).

The light extracting elements are configured to extract light in a defined intensity profile, such as uniform intensity, and/or a defined light ray angle distribution over the light output region 28. Using variations in the light extracting elements, each light output region 28 need not have the same intensity profile and/or light ray angle distribution. Intensity profile refers to the variation of intensity with position within a light-emitting region (such as light output region 28). Light ray angle distribution refers to the variation of intensity with ray angle (typically a solid angle) of light emitted from a light-emitting region (such as light output region 28).

Exemplary light extracting elements include light-scattering elements, which are typically features of indistinct shape or surface texture, such as printed features, ink jet printed features, selectively-deposited features, chemically etched features, laser etched features, and so forth. Other exemplary light extracting elements include features of well-defined shape, such as V-grooves, lenticular grooves, and features of well-defined shape that are small relative to the linear dimensions of the major surfaces 22, 24, which are sometimes referred to as micro-optical elements. The smaller of the length and width of a micro-optical element is less than one-tenth of the longer of the length and width of the light guide 20, and the larger of the length and width of the micro-optical element is less than one-half of the smaller of the length and width of the light guide. The length and width of the micro-optical element are measured in a plane parallel to the major surface 22, 24 of the light guide 20 for flat light guides 20 or along a surface contour for non-flat light guides 20.

Micro-optical elements are shaped to predictably reflect light or predictably refract light. However, one or more of the surfaces of the micro-optical elements may be modified, such as roughened, to produce a secondary effect on light output. Exemplary micro-optical elements are described in U.S. Pat. No. 6,752,505 and, for the sake of brevity, will not be described in detail in this disclosure. The micro-optical elements may vary in one or more of size, shape, depth or height, density, orientation, slope angle, or index of refraction such that a desired light output from the light guide 20 is achieved over the corresponding light output region 28.

As indicated, the lighting assembly 10 includes an optical adjuster 30. The optical adjuster 30 has opposed major surfaces 32 and 34. One of the major surfaces, e.g., major surface 34 in the appended figures, of the optical adjuster 30 faces one of the major surfaces, e.g., major surface 22 in the appended figures, of the light guide 20. The major surface 34 is juxtaposed with and conforms in surface contour to the facing major surface 22 of the light guide 20. In the embodiment where the light guide 20 is planar (e.g., as shown by example in FIGS. 2 and 3), the optical adjuster 30 is planar and located adjacent one of the major surface 22. Depending on the orientation of the lighting assembly 10, the optical adjuster 30 may be located above, below, or to the side of the light guide 20. In another example in which the light guide 20 is configured as a hollow cylinder such as shown in FIG. 1, the optical adjuster 30 also is a hollow cylinder and is located inside the light guide 20 or outside the light guide 20 in a coaxial manner. In the embodiment of FIGS. 1 and 8A, the optical adjuster 30 is coaxially located outside the light guide 20 with the major surface 34 conforming to the major surface 22. In embodiments with other geometries, the optical adjuster 30 has a different shape than the light guide 20, but the facing surfaces of the optical adjuster 30 and the light guide 20 conform to each other.

The major surface 34 of the optical adjuster 30 that faces the light guide 20 is separated from the major surface 22 so that it does not disrupt the total internal reflection within the light guide 20. In one embodiment, one or more spacers 35 (e.g., FIG. 7) are present between the optical adjuster 30 and the light guide 20 to assist in maintaining a desired gap between the optical adjuster 30 and the light guide 20.

One or more additional optical adjusters (e.g., a film with an optical characteristic) may be located in tandem with the optical adjuster 30 and the light guide 20. Exemplary additional optical adjusters will be described in more detail below with reference to FIGS. 6B and 6C.

For each light output region 28 of the light guide 20, the optical adjuster 30 has two or more optical adjuster regions. In the embodiment of FIG. 3, for example, the optical adjuster 30 has a first region 36 and a second region 38 for each light output region 28. There may be three, four or some other number of optical adjuster regions for each light output region 28, and each light output region 28 need not have the same number of optical adjuster regions.

At least one of the regions 36, 38 of the optical adjuster 30 has an optical modifying characteristic. For instance, in the illustrated embodiment of FIG. 3, each first region 36 has an optical modifying characteristic denoted by hatching shown on the corresponding portion of the optical adjuster 30. In the illustrated embodiment, each first region 36 has the same optical modifying characteristic, but this need not be the case and/or one or more of the first regions 36 need not have any optical modifying characteristic.

An optical modifying characteristic is indicated by an effect that the region has on light that is incident on the region. Exemplary optical modifying characteristics include reflective, diffusive, light redirecting, polarizing, reflective polarizing, intensity reducing, wavelength shifting and color attenuating. Wavelength shifting is used herein to refer to a process in which a material absorbs light at certain wavelengths, and reemits the light at one or more different wavelengths. Wavelength shifting may be achieved using a phosphor material, a luminescent material, a luminescent nanomaterial such as a quantum dot material, a conjugated polymer material, an organic fluorescent dye, an organic phosphorescent dye, lanthanide-doped garnet, or the like. Color attenuating may be achieved using color filtering material. For purposes of this description, the lack of an optical modifying characteristic is considered a region of the optical adjuster 30 that is specularly transmissive, even though specularly transmissive material refracts light that passes through the material at a non-zero angle of incidence. Each second region 38 also may have an optical modifying characteristic or may be specularly transmissive. In the illustrated embodiments, the change in optical characteristic from the first region 36 to the second region 38 is abrupt. In other embodiments, the transition between the first region 36 and the second region 38 may be gradual. A gradual transition may be appropriate where at least one of the regions 36, 38 has an optical modifying characteristic related to intensity reducing, wavelength shifting or color attenuating, but also may be used in other situations. The effect that the regions 36, 38 have on light that is output from the lighting assembly 10 will be described in greater detail below.

Figure 4:
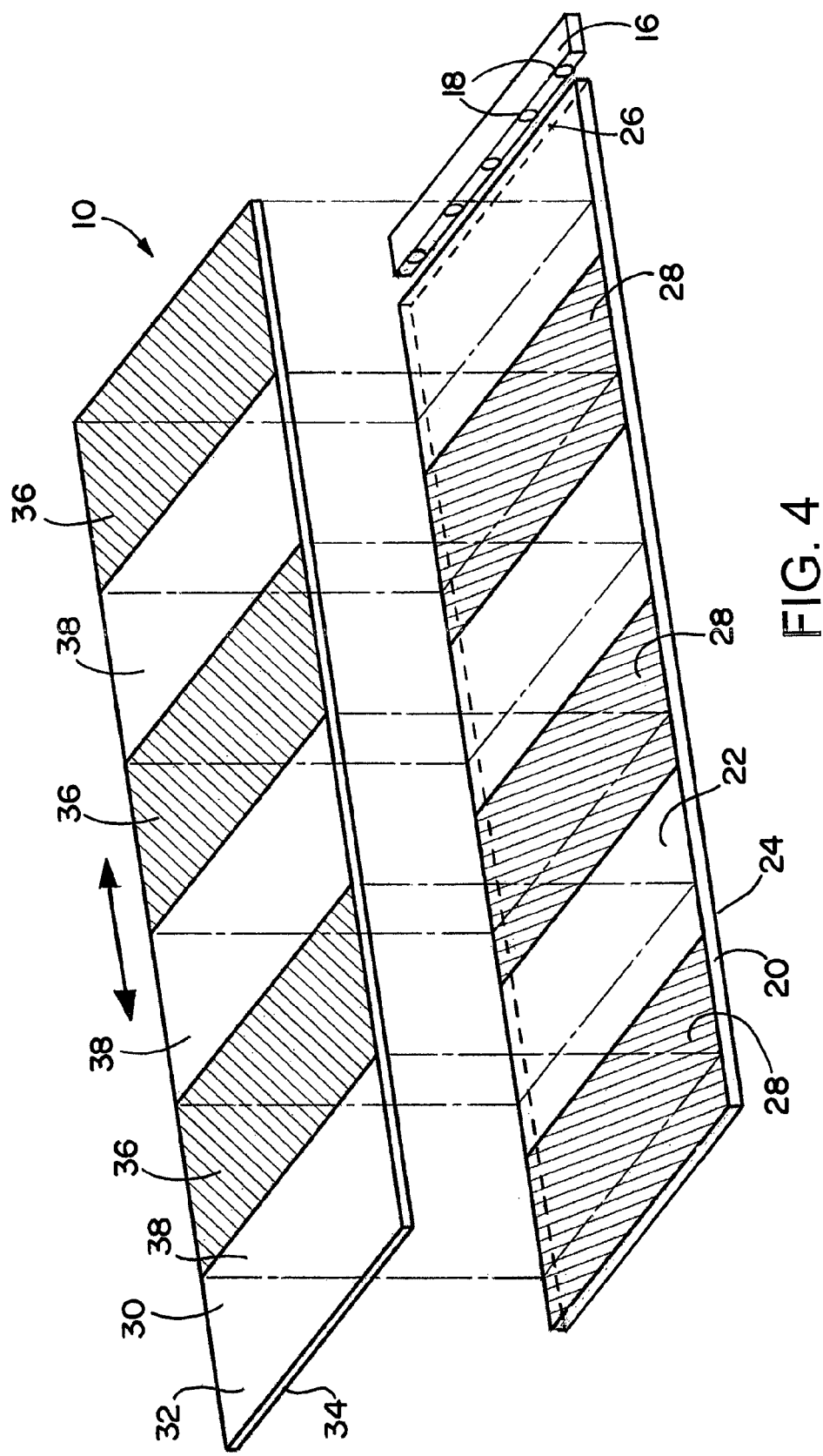
Figure 5:
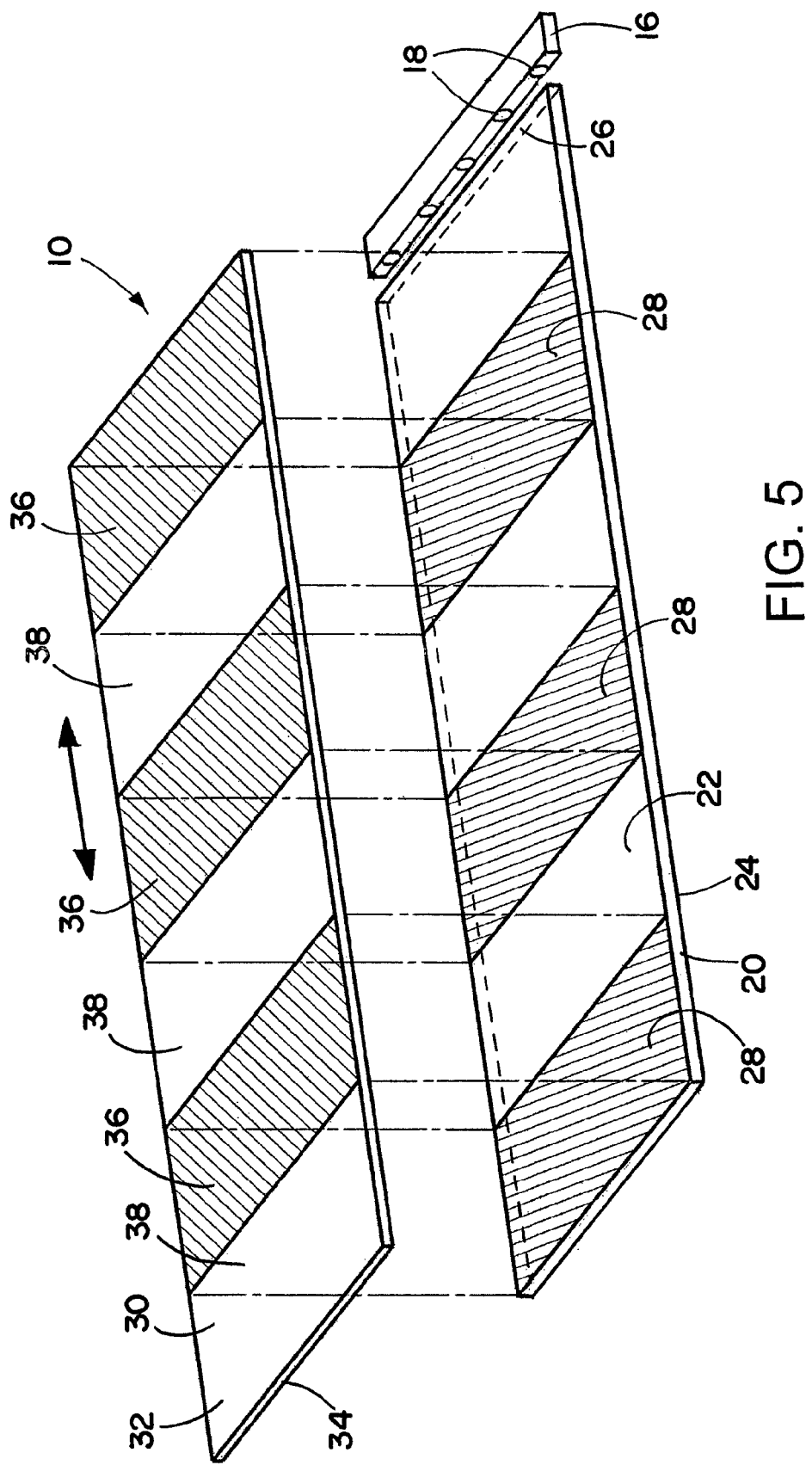

With additional reference to FIGS. 4 and 5, the optical adjuster 30 and the light guide 20 are moveable relative to each other. In the example shown, the optical adjuster 30 axially translates (e.g., slides) relative to the light guide 20 so that the amount of overlap between the first region 36 and the light output region 28 is adjustable and a corresponding change occurs in the amount of overlap between the second region 38 and the light output region 28. In the example shown in FIG. 5, the amount of overlap has been adjusted so that the light output region 28 aligns with the first region 36 so that all or nearly all light that is emitted from the light output region 28 is incident on the first region 36 and is modified by the first region's light modifying characteristic. In the example shown in FIG. 3, the amount of overlap has been adjusted so that the light output region 28 aligns with the second region 38 so that all or nearly all light that is emitted from the light output region 28 is incident on the second region 38 and is modified by the second region's light modifying characteristic, if any. In the example shown in FIG. 4, a portion of the first region 36 and a portion of the second region 38 align with the light output region 28 so that a portion of the light emitted by the light output region 28 is incident on the first region 36 and is modified by the first region's light modifying characteristic, and a portion of the light emitted by the light output region 28 is incident on the second region 38 and is modified by the second region's light modifying characteristic, if any. In FIGS. 3-5, the amount of overlap is illustrated using broken lines that show the position of edges of the first regions 36 relative to the light output regions 28. In one embodiment, the surface area and the shape of the first region 36 and the surface area and the shape of the second region 38 are the same as a surface area and a shape of the light output region 28. But the surface areas and shapes of one or both of the regions 36, 38 need not be the same as the surface area and shape of the light output region 28.

The lighting assembly 10 holds one of the optical adjuster 30 or the light guide 20 in a fixed position while allowing movement of the other of the optical adjuster 30 or the light guide 20. Alternatively, both the optical adjuster 30 and the light guide 20 are moveable. The relative movement may allow for adjustment of the amount of overlap of the first region 36 with the light output region 28, and correspondingly the amount of overlap of the second region 38 with the light output region 28, in any selective apportionment between two extremes. Alternatively, movement may be made in increments to adjust the amount of overlap among defined locations.

The movement allows for selectively apportioning light that is emitted from the light output region 28 between the amount of light that is incident on the first region 36 and the amount of light that is incident on the second region 38. Light that is incident on the first region 36 is modified by the light modifying characteristic of the first region 36. Similarly, if the second region 38 has a light modifying characteristic, light that is incident on the second region 38 is modified by the light modifying characteristic of the second region 38. Otherwise, the light that is incident on the second region 38 is output from the second region with no operably-effective modification. In this manner, light output from the lighting assembly 10 is modified based on relative positioning of the optical adjuster 30 and the light output region 28 of the light guide 20.

In one embodiment, the relative positioning is varied manually by a user. In the example shown in FIG. 1, the lighting assembly 10 includes a user-manipulable mechanism 42 that moves one or both of the light guide 20 and the optical adjuster 30 relative to the other to vary the relative positioning of the light guide 20 (and hence the light output region 28) and the optical adjuster 30. As shown in FIG. 1, the light guide 20 is fixed relative to a housing 40 and the optical adjuster 30 is rotatably moveable relative thereto by the manual application of force to the mechanism 42. In the embodiment of FIG. 1, the mechanism 42 is a member that is secured to the optical adjuster 30 and slides over a portion of the housing 40 of the light bulb 12. In one embodiment, the amount of movement is limited by stops (not illustrated). Other manually-operated mechanisms are possible. For instance, other types of sliders may be employed or a turnable knob may act on the moveable component through a gear or drive train. In other embodiments, the mechanism 42 is motorized to move one or both of the light guide 20 and the optical adjuster 30 relative to the other. The motorized mechanism may be controlled by a control assembly (not shown) to adjust light output based on user input, feedback from sensors, or a triggering event. In still other embodiments, there is no mechanism 42 and the adjustment is made by applying a positioning force, which in the case of the exemplary cylinder is torque, directly to the moveable one of the optical adjuster 30 and the light guide 20.

Once positioned, the relative positioning of the light guide 20 and the optical adjuster 30 remains unchanged until the user or control assembly varies the relative positioning. Since constant motion of the light guide 20 relative to the optical adjuster 30 is not contemplated during operation of the lighting assembly 10, the range of movement of the light guide 20 and/or the optical adjuster 30 may be limited. The range of movement may be limited to back-and-forth sliding that moves the first region 36 in and out of alignment with the light output region 28, rather than allowing infinite movement of the light guide 20 or the optical adjuster 30 in one direction.

A visual indicator may be present to provide the user with an indication of the modification applied to the light output of the lighting assembly 10. In the illustrated embodiment of FIG. 1, for example, markings 44 are present on the optical adjuster 30 and align relative to a pointer 46 on the housing to provide this indication.

FIG. 6A illustrates another example of the light guide 20 and the optical adjuster 30. In this example, the light guide 20 and the optical adjuster 30 are disk-shaped, but other shapes are possible. A hole 48 extends through the light guide 20 between the major surfaces 22, 24 and the edge of the hole 48 provides the light input edge 26 through which light is input into the light guide 20. In the embodiment of FIG. 6A, the relative positioning between the light output regions 28 of the light guide 20 and the first regions 36 of the optical adjuster 30 is varied by rotation of one or both of the light guide 20 and the optical adjuster 30 relative to the other. The optical adjuster 30 has a contiguous portion that establishes the second region 38 in which the spaced-apart first regions 36 are defined. In the illustrated embodiment, the first regions 36 and the light output regions 28 are congruent. The optical adjuster 30 of the illustrated embodiment has a hole for mounting to a spindle or other mechanism (not shown) to allow movement thereof. Other than having a different type of movement to vary the relative positioning (rotation instead of translation), the embodiment of FIG. 6A achieves modification of the light output in the same manner as the embodiment of FIGS. 3-5. Therefore, for the sake of brevity, modification of the light output by varying the relative positioning of the light guide 20 and the optical adjuster 30 to vary the amount of overlap between the first and second regions 36, 38 and the light output regions 28 will not be described.

In an example, the first regions 36 are transmissive but configured with an additional optical modifying characteristic and the second region 38 is reflective. Varying the relative positioning of the optical adjuster 30 and the light guide 20 modifies the direction in which the light is emitted from the lighting assembly 10. In one example of the relative positioning of the optical adjuster 30 and the light guide 20, the transmissive first regions 36 are aligned with the light output regions 28. In this example, the light output from the light output regions 28 and incident on the transmissive first regions 36 is modified by the optical characteristics of the first regions 36 and is output from the lighting assembly 10 in a direction away from the major surface 22. In another example of the relative positioning of the optical adjuster 30 and the light guide 20, the reflective second region 38 is aligned with the light output regions 28. In this example, light output from the light output regions 28 and incident on the second region 38 is reflected back into the light guide 20 through the respective light output region 28 and passes through the light guide 20 and out the major surface 24. This light is output from the lighting assembly 10 in a direction away from the major surface 24, i.e., in a direction opposite that of the light that was output with the light output regions 28 aligned with the first regions 36. The light extracting elements of the light guide 20 also may be configured so that light is additionally output from the major surface 24 by disruption of the total internal reflection of the light propagating in the light guide 20.

In a variation of the lighting assembly 10 of FIG. 6A, half (by area) of the optical adjuster 30 is specularly transmissive and half (by area) of the optical adjuster 30 is specularly reflective (e.g., half of the optical adjuster 30 provides the transmissive first regions 36 contiguously or non-contiguously, and half of the optical adjuster 30 provides the reflective second region 38 correspondingly contiguously or non-contiguously). Half of the major surface 22 provides the light output regions 28 correspondingly contiguously or non-contiguously. Depending upon the relative positioning of light guide 20 and optical adjuster 30, the light output of the lighting assembly 10 can be adjusted to provide a light output distribution anywhere between all of the light output from the light output regions 28 being directed out of the lighting assembly 10 in a direction away from the major surface 22 and all of the light output from the light output regions 28 being directed out of the lighting assembly 10 in a direction away from the major surface 24.

Figure 6B:
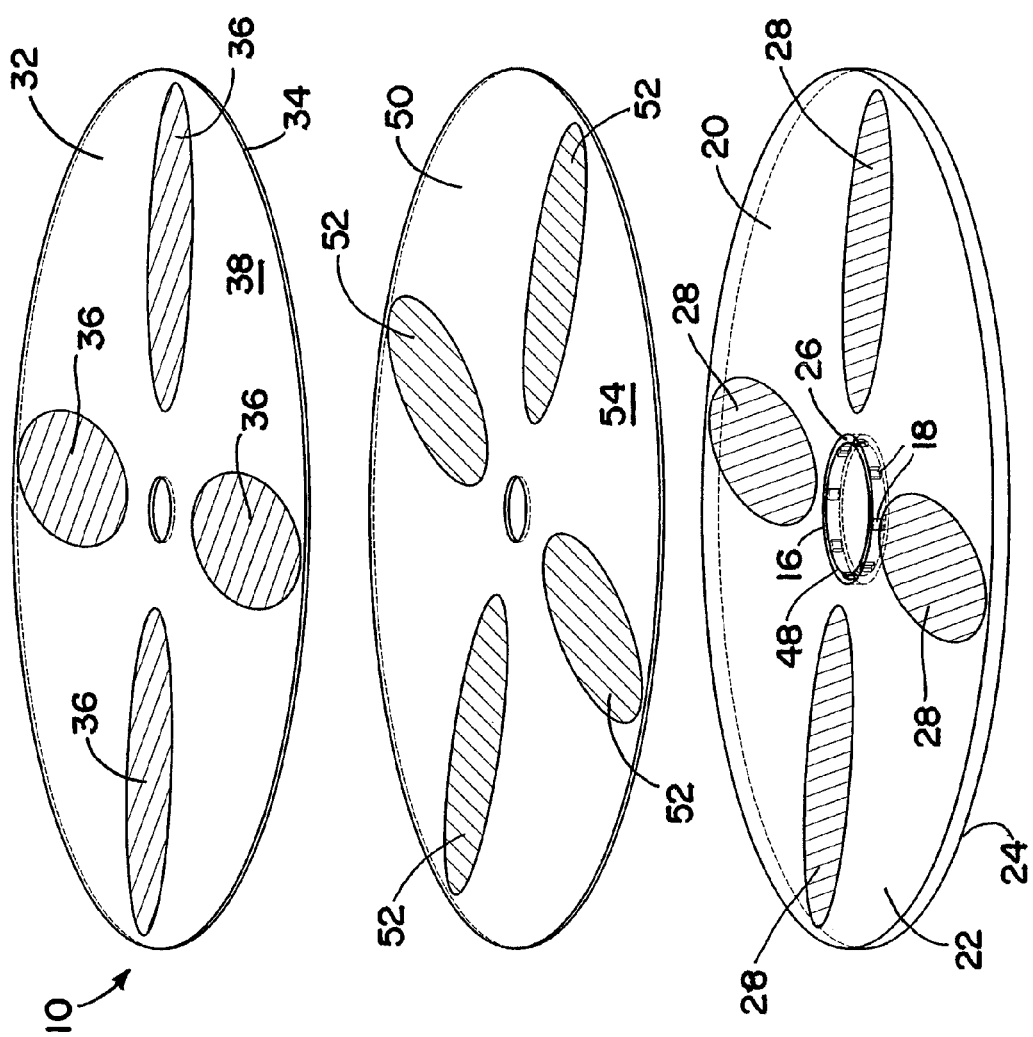

In the example shown in FIG. 6B, the light guide 20 and the optical adjuster 30 are similar to those of FIG. 6A, but a second optical adjuster 50 is located between the light guide 20 and the first optical adjuster 30, specifically between major surfaces 22 and 34. The second optical adjuster 50 has a contiguous portion that provides a second region 54 in which spaced-apart first regions 52 are defined. In some embodiments, the light extracting elements of the light guide 20 are configured so that light output regions 28 are at the major surface 22. In the illustrated embodiment, the first regions 52 are congruent with the light output regions 28 of the light guide 20. In an example, the second region 54 is reflective and the spaced-apart first regions 52 are specularly transmissive or the first regions 52 are openings defined in the contiguous second region 54. The second optical adjuster 50 modifies a characteristic of the light before it becomes incident on the first optical adjuster 30 in accordance with the optical modifying characteristics of the first regions 52 and the second region 54 of the second optical adjuster and the relative positioning of the second optical adjuster and the light output regions 28 of the light guide 20. The first optical adjuster 30 then further modifies the characteristic (or modifies a different characteristic) of the light output by the lighting assembly 10 in accordance with the optical modifying characteristics of the first regions 36 and the second region 38 of the first optical adjuster 30 and the relative positioning of the first optical adjuster 30, the second optical adjuster 50, and the light output regions 28 of the light guide 20. Thus, the light output from the lighting assembly 10 is modified by various combinations of the optical modifying characteristics of the optical adjusters 30 and 50 depending on relative positioning between the light output regions 28 of the light guide 20 and the optical adjusters 30, 50.

In the illustrated embodiments of FIGS. 6A and 6B, the light output regions 28 each are in the exemplary shape of an oval and have a corresponding first regions 52 in the shape of the exemplary oval in the second optical adjuster 50 and a corresponding first regions 36 in the shape of the exemplary oval in optical adjuster 30. Other shapes are possible, such as sectors, trapezoids, squares, triangles, circles, etc. In one embodiment, the angular offset of the first regions 52 from one another on the second optical adjuster 50 matches the angular offset of the first regions 36 from one another on the optical adjuster 30 so that the same amount of overlap is achieved between each corresponding pair of the first region 52 and the first region 36. But this need not be the case so that different amounts of overlap are achieved between each corresponding pair of the first region 52 and the first region 36. In one embodiment, the angular offset of the light output regions 28 from one another matches the angular offset of the first regions 36 from one another on the optical adjuster 30 and/or matches the angular offset of the first regions 52 from one another on the second optical adjuster 50, but this need not be the case Also, the light guide 20 and optical adjusters 30, 50 need not be circular (e.g., they may be rectangular) and need not be planar (e.g., they may be hollow cylinders, or hollow and frustroconical).

In the embodiment illustrated in FIG. 6B, the optical adjusters 30, 50 are configured to rotate through a confined range of rotation relative to the light guide 20 and/or each other. Additionally or alternatively, the light guide 20 is configured to rotate through a confined range of rotation. For this purpose, one or both of optical adjusters 30, 50 is mounted on a spindle (not illustrated) or bearing assembly (not illustrated), rotation about which varies the relative positioning of the light guide 20, the optical adjuster 30, and the additional optical adjuster 50.

Figure 6C:
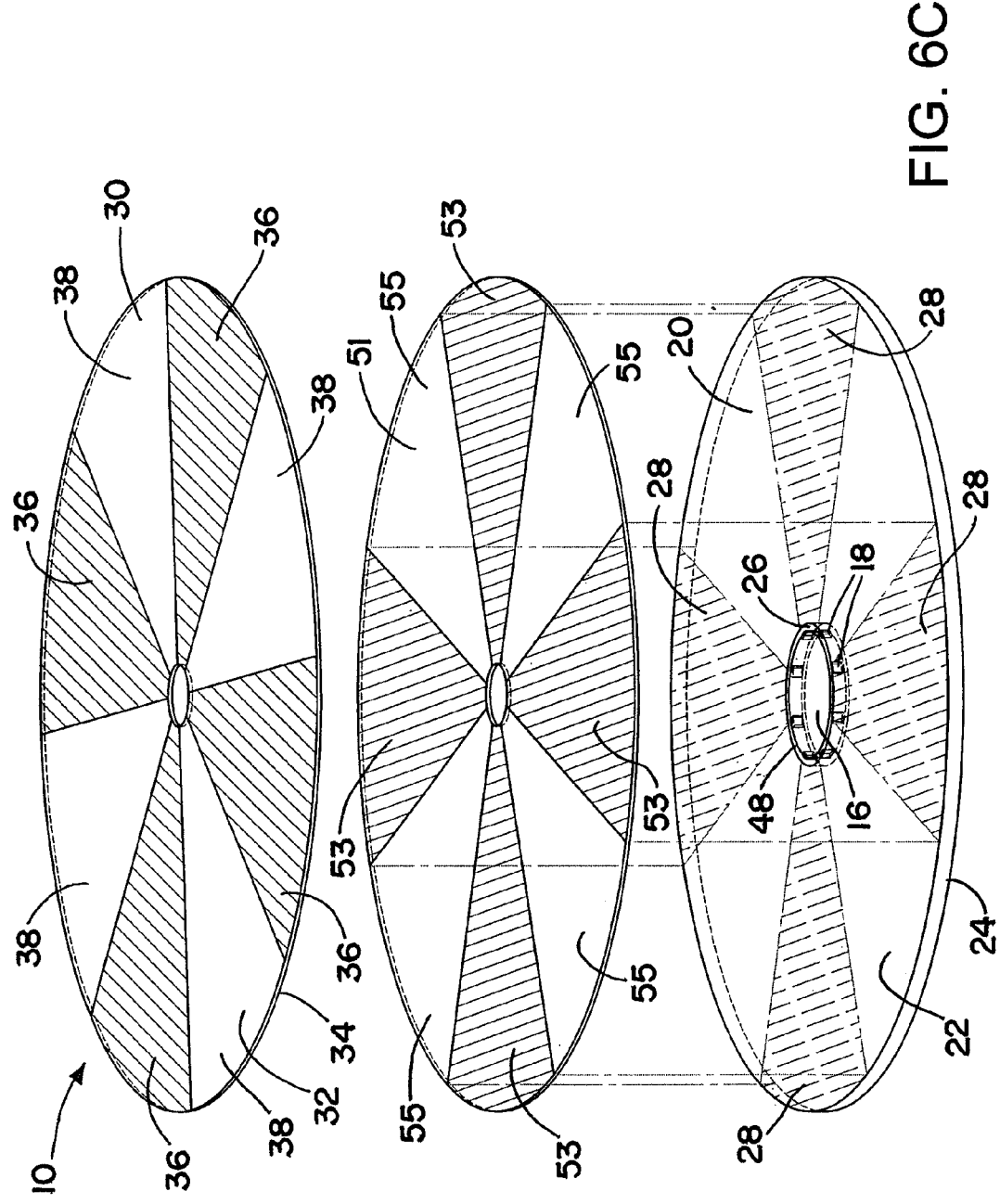

In the above-described embodiments, the light output regions 28 of the light guide 20 are defined by respective regions of light extracting elements at one or both of the major surfaces 22, 24 of the light guide. In other embodiments, the light extracting elements cover all or nearly all of one or both major surfaces 22, 24 of the light guide, and the light emission regions are defined by an auxiliary optical adjuster. With reference to FIG. 6C, another embodiment of a lighting assembly 10 employing the optical adjuster 30 and a light guide having an auxiliary optical adjuster 51 is illustrated.

In the embodiment of FIG. 6C, the light extracting elements (not shown) of the light guide 20 are configured so that light is output from all or nearly all of the major surface 22 of the light guide 20. The auxiliary optical adjuster 51 has first regions 53 that are transmissive (e.g., specularly transmissive), and second regions 55 that are reflective. Each first region 53 of the auxiliary optical adjuster 51 defines a respective light output region 28 of light guide 20. The light output regions 28 projected onto the major surface 22 of the light guide 20 are denoted by broken lines in FIG. 6C. In the example shown, the first regions 53 and second regions 55 are equal in area, but this need not be the case.

In the example shown, the auxiliary optical adjuster 51 is a solid article juxtaposed with and independent of the light guide 20. The first regions 53 of the auxiliary light guide 51 may be provided by openings in a contiguous second region 55, or by spaces absent of material forming the auxiliary optical adjuster 51 between non-contiguous second regions 55. Embodying the auxiliary optical adjuster 51 as a solid article separate from the light guide 20 allows the positions of the light output regions 28 defined by the first regions 53 of the auxiliary optical adjuster 51 to be varied by varying the position of the auxiliary optical adjuster 51 and without varying the position of the light guide 20. Alternatively, the auxiliary optical adjuster 51 embodied as a solid article may be fixed in position relative to the light guide 20, in which case, the positions of the light output regions 28 are varied by varying the position of the light guide 20 and auxiliary optical adjuster 51 together. In other examples, the auxiliary light guide 51 is integral with the light guide 20. For example, sectors of reflective material may be deposited on or affixed to one of the major surfaces of the light guide 20 to provide the reflective second regions 55 of the auxiliary optical adjuster 51, with the uncovered portions providing the transmissive first regions 53. In examples in which the auxiliary light guide 51 is integral with the light guide 20, the position of the light guide 20 is varied to vary the positions of the light output regions 28 defined by the first regions 53 of the auxiliary optical adjuster 51. In some embodiments, the first regions 53 of the auxiliary optical adjuster 51 are transmissive and have an additional optical characteristic (e.g., color attenuating).

In the embodiment of FIG. 6C, the first regions 36 of the optical adjuster 30 are transmissive (e.g., specularly transmissive or transmissive with an additional optical characteristic, such as color attenuating or diffusive) and the second regions 38 of the first optical adjuster 30 are reflective. The light output from the light guide 20 and incident on the reflective second regions 55 of the auxiliary optical adjuster 51 is reflected back into the light guide 20, and the reflected light exits the light guide 20 through the major surface 24. Light output from the light guide 20 and transmitted through the first regions 53 of the second optical adjuster 50 is incident on the optical adjuster 30. The relative positioning of the optical adjuster 30 and the light output regions 28 (defined by the first regions of the auxiliary optical adjuster 50) apportions the light exiting the light output regions 28 between the transmissive first portions 36 and the reflective second portions 38 of the optical adjuster 30. The portion of the light exiting the light output regions 28 and incident on the first regions 36 of the optical adjuster 30 is output from the lighting assembly 10 in a direction away from the major surface 22 of the light guide 20. But the portion of the light exiting the light output regions 28 and incident on the reflective second regions 38 of the optical adjuster 30 is reflected back through the light output regions 28 (defined by the transmissive first regions 53 of the auxiliary optical adjuster 51), enters the light guide 20 through the major surface 22, passes through the light guide 20 and is output from the lighting assembly in a direction away from the major surface 24 of the light guide 20, i.e., in a direction opposite that in which the portion of the light incident on the transmissive first portions 36 is output. Therefore, the light output from the lighting assembly 10 is selectively apportioned between light that is output in the direction away from the major surface 22 and light that is directed away from the major surface 24. The apportionment depends on the overlap between the light output regions 28 of the light guide (defined by the transmissive first regions 53 of the auxiliary optical adjuster 51) and the transmissive first regions 36 of the optical adjuster 30, with the apportionment depending on the relative positioning of the optical adjuster 30 and the light output regions 28 of the light guide 20 defined by the auxiliary optical adjuster 51. The light extracting elements of the light guide 20 also may be configured so that light is additionally output from the major surface 24 of the light guide 20.

FIG. 7 illustrates an example of another embodiment of a lighting assembly 10 having an adjustable light output. In this example, the light guide 20 and the optical adjuster 30 are hollow, frustroconical and coaxial, and the optical adjuster 30 is located radially inward from the light guide 20. In this embodiment, as with the embodiments where the light guide 20 and the optical adjuster 30 are cylindrical, the amount of overlap between the first region 36 and the light output region 28 is controlled by the relative positioning of the optical adjuster 30 and the light output region 28 of the light guide 20 in rotation.

In some embodiments, the light guide 20 supports the optical adjuster 30. In other embodiments the optical adjuster supports the light guide. In the example shown in FIG. 7, for example, hanger members 58 suspend the light guide 20 from the optical adjuster 30. Other support configurations are possible. In an example, the housing 40 of the light bulb 12 (FIG. 1), or a housing 59 (FIG. 2) of the lighting fixture 14 supports both the optical adjuster 30 and the light guide 20 in a manner that retains the optical adjuster 30 and the light guide 20 within the lighting assembly 10. Other exemplary supports include poles, hooks, hubs, bearings, mating slots and ridges, mating indents and detents, etc. In one embodiment, the optical adjuster 30 is replaceable with another optical adjuster 30 having different optical characteristics to permit more light modification options.

A number of embodiments of the lighting assembly 10 described above with reference to FIGS. 1-7 and configured for various applications will now be described.

Some applications call for the lighting assembly 10 to output light with specific light ray angle distributions. Embodiments configured for use in such applications modify the light ray angle distribution of the light output from the light output region 28 of the light guide 20 to provide output light having a light ray angle distribution suitable for the application. In an example, the first region 36 has optical elements configured as light redirecting elements. In this case, the light output from the light output region 28 of the light guide 20 is incident on the first region 36 and is redirected in accordance with the light redirecting characteristics of the light redirecting elements in the first region 36. In one variation of this example, the second region 38 has a second light modifying characteristic (e.g., a diffusive characteristic) such that the light received from the light output region 28 is modified to have a light ray angle distribution broader than that of the light output by the first region 36. In another variation, the second region 38 has light redirecting elements that redirect the light received from the light output region 28 differently from the light redirecting elements of the first region 36 such that light ray angle distribution of the light redirected by the second region 38 has a peak intensity at a different ray angle and/or has a broader or a narrower peak than that of the light redirected by the first region 36.

In a configuration of lighting assembly 10 suitable for another application, the lighting assembly 10 modifies the direction of the light output by the lighting assembly. The first region 36 is reflective and the second region 38 is transmissive (e.g., specularly transmissive, diffusive, or light redirecting). In this manner, the direction of the light output by the lighting assembly 10 is controlled by the relative positioning of the light output region 28 of the light guide 20 and the optical adjuster 30. Similar to the example described above with reference to FIG. 6A, when the output light is to be output from the major surface 22 having the light output region 28, the transmissive second region 38 is aligned with the light output region 28 so that the second region 38 transmits the light output from the light output region 28. When the output light is to be output from the other major surface 24, the reflective first region 36 is aligned with the light output region 28 so that the first region 36 reflects the light output from light output region 28 back toward and through the light guide 20. When the output light is to be output from both the major surfaces 22, 24, the first and second regions 36, 38 are positioned so that a portion of each partially overlaps the light output region 28. With this positioning, part of the light from the light output region 28 is transmitted by the second region 38 and part (typically the remainder) of the light from the light output region 28 is reflected by the first region 36. The amount of overlap of the respective regions 36, 38 with the light output region 28 determines the apportioning of the light from the light output region 28 between the two directions.

In some embodiments, an optical component (not shown) that does not move relative to the light guide 20 is adjacent the light guide 20 on the side opposite the optical adjuster 30 to modify the light reflected by the reflective first region 36. The optical component may be reflective, diffusive, light redirecting, polarizing, reflective polarizing, intensity reducing, wavelength shifting, or color attenuating, for example.

In a configuration of lighting assembly 10 suitable for still other exemplary applications, the lighting assembly 10 modifies the color of the light output from the lighting assembly 10. For example, in an embodiment of a portable lamp, such as a lantern, the first region 36 and the second region 38 are specularly transmissive and the first region 36 additionally includes a color filter. In an example, positioning the second region 38 in alignment with the light output region 28 causes white light to be output from the lighting assembly 10, whereas positioning the first region 36 in alignment with the light output region 28 causes colored light to be output from the lighting assembly 10.

The color of the light output by the lighting assembly 10 may be changed using a color filter layer on or as part of the optical adjuster 30 in one or both regions 36, 38 thereof, a color filtering material composition of the optical adjuster in one or both regions 36, 38 thereof, a dichroic filter on or as part of the optical adjuster in one or both regions 36, 38 thereof, or a wavelength shifting material on or as part of the optical adjuster in one or both regions 36, 38 thereof. In one example, the lighting assembly 10 is configured to change color temperature of the light output. Many LED light sources 18 emit light in a range of wavelengths intended to achieve a corresponding color temperature. However, within batches of LEDs having the same nominal color temperature, there is variation of color temperature from LED to LED. Also, sometimes broad-spectrum LEDs (e.g., "white light" LEDs) or groups of tri-color LEDs (e.g., a red LED, a blue LED and a green LED whose outputs combine to produce white light) do not produce a color temperature that is desirable to a user or appropriate for a certain lighting application. To modify the color temperature of the light output from the lighting assembly 10, the first region 36, and possibly the second region 38, may be used. For instance, the first region 36 may modify the light output to be warmer (either or both of more red and less blue) and the second region 38 may modify the light output to be cooler (either or both of more blue and less red).

Some embodiments are configured to allow a user to adjust the color temperature of light output from the lighting assembly 10 in order to achieve a desired color temperature. Other embodiments are configured to allow a manufacturer of the lighting assembly 10 to adjust the color temperature of light output from the lighting assembly 10 to compensate for different color temperatures associated with different lots of light sources 18. This allows the lighting assembly manufacturer to source a broader range of light sources 18 from one or more suppliers and still manufacture lighting assemblies with a defined, consistent color temperature.

In some embodiments, the relative positioning of the light output region of the light guide 20 and the optical adjuster 30 is varied by the manufacturer of the lighting assembly 10 until the output light has a defined characteristic (e.g., a defined color temperature is obtained). The relative positioning is then fixed by the manufacturer, and the lighting assembly 10 is configured in a manner to minimize the ability of a user of the lighting assembly 10 to further vary the relative positioning. In other embodiments, the user has the ability to vary the relative positioning.

Configurations of the light assembly 10 suitable for other applications will be apparent based on using any of the above-noted light modifying characteristics for the first region 36, or based on using any combination of the above-noted light modifying characteristics for the first region 36, the second region 38, and any additional regions of the optical adjuster 30 that are capable of overlapping with the light output region 28 of the light guide 20.

Figure 9:
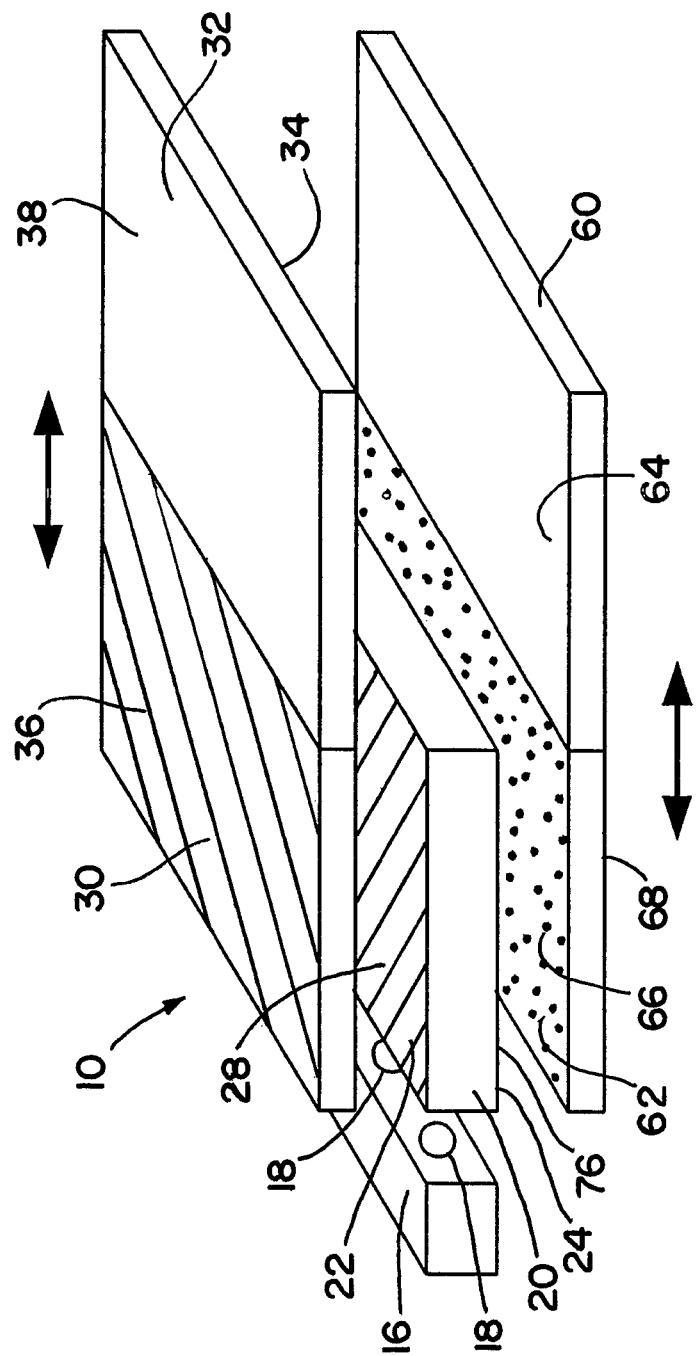
FIG. 9 is a schematic view showing part of an embodiment of a lighting assembly having adjustable light output.

With additional reference to FIGS. 8A and 9, some embodiments of the lighting assembly 10 include the optical adjuster 30, sometimes referred to as the first optical adjuster 30, and a second optical adjuster 60. Each of the optical adjusters 30, 60 is configured in accordance with the foregoing embodiments so that each optical adjuster 30, 60 has a respective first region 36, 62 having a respective light modifying characteristic and a respective second region 38, 64 that has a respective light modifying characteristic or is specularly transmissive. The light modifying characteristics of the first regions 36, 62 and/or, if applicable, the second regions 38, 64 need not be the same.

The light output region 28 of the light guide 20, the first optical adjuster 30 and the second optical adjuster 60 are variably positionable relative to one another. In one embodiment, the relative positioning of the light guide 20 and the second optical adjuster 60 is independent of the relative positioning of the light guide 20 and the first optical adjuster 30. In another embodiment, the relative positioning of the light guide 20 and second optical adjuster 60 is dependent on the relative positioning of the light guide 20 and the first optical adjuster 30. In some embodiments, one or both of the optical adjusters 30, 60 are variably positionable relative to the light output region 28 of the light guide 20.

In the illustrated embodiments, the first and second optical adjusters 30, 60 are on opposite sides of the light guide 20 so that one major surface 34 of the first optical adjuster 30 faces one major surface 22 of the light guide 20 and one major surface 66 of the second optical adjuster 60 faces the other major surface 24 of the light guide 20. The other major surface 68 of the second optical adjuster 60 faces away from the light guide 20. Additionally, the major surface 66 is juxtaposed with, and conforms in surface contour to, the facing major surface 24 of the light guide 20. In other embodiments, both the first optical adjuster 30 and the second optical adjuster 60 are located on the same side of the light guide 20.

In an embodiment where there are two optical adjusters 30, 60 on opposite sides of the light guide 20, light output from the light output region 28 is incident on the second optical adjuster 60. In this embodiment, the second region 64 of the second optical adjuster 60 is reflective to reflect the incident light back through the light guide 20. The amount of reflected light depends on the amount of overlap of the reflective second region 64 with the light emitting region 28. The reflected light, after exiting the major surface 22 is incident on the first optical adjuster 30. Light incident on the first optical adjuster 30 is apportioned between the first and second regions 36, 38 depending on the overlap of these regions with the reflected light. The light modifying characteristics of the first and/or second regions 36, 38 modify the light respectively incident on these regions 36, 38, thereby modifying the overall characteristics of the light output from the lighting assembly 10.

An exemplary embodiment of the lighting assembly 10 shown in FIG. 8A has a light output selectable from a narrow light ray angle distribution, a broad light ray angle distribution, and an intermediate light ray angle distribution, depending on the relative positioning of the light output region 28 of the light guide 20 and the optical adjusters 30, 60. The intermediate light ray angle distribution is a light ray angle distribution between the narrow light ray angle distribution and the broad light ray angle distribution, and results from a combination of the two depending on the apportioning of the light output from the light guide between regions of the optical adjusters.

Operation of the embodiment shown in FIG. 8A will be described next with additional reference to FIGS. 8B and 8C. The first region 62 of the second optical adjuster 60 is transmissive, the second region 64 of the second optical adjuster 60 is reflective, and the first and second regions 36, 38 of the first optical adjuster 30 are transmissive and have respective light redirecting characteristics. Additionally, the light output region 28 is on the major surface 24 of the light guide 20 facing the second optical adjuster 60, and the light guide 20 is configured to have minimal light output from the major surface 22.

As represented by the light ray 72 in FIG. 8B, the light extracting elements for the light output region 28 are configured to output light from the light output region 28 at low ray angles. Low ray angles are ray angles directed away from the light source 18 and are predominantly at less than 45 degrees relative to the major surface 24 of the light guide 20. As indicated, the first region 62 of the second optical adjuster 60 is transmissive. In an example in which the first region 62 is specularly transmissive, the light from the light output region 28 exits the lighting assembly 10 at low ray angles and has a narrow light ray angle distribution. In an example in which the first region 62 is light redirecting and is configured to turn the light to even lower ray angles, the light ray angle distribution has a peak at a lower ray angle than in the example in which the first region 62 is specularly transmissive. Additionally, the peak may be narrower.

As represented by the light ray 74 in FIG. 8C, when the reflective second region 64 of the second optical adjuster 60 overlaps the light output region 28, the second region 64 reflects the light output from the light output region. The reflected light re-enters the major surface 24, passes through the light guide 20, exits the major surface 22, and is incident on the first optical adjuster 30. The first optical adjuster 30 is transmissive, so that light exits the lighting assembly 10 in a direction away from the major surface 22 of the light guide 20. To provide a desired amount of adjustability to the characteristics of the reflected light, the first region 36 may be one of specularly transmissive (e.g., so that the first region outputs light with the same light ray angle distribution as that of the light incident on the optical adjuster 30), diffusive (e.g., so that the first region 36 outputs light with a broader ray angle distribution than that of the light incident on optical adjuster 30), or light-redirecting so that the first region 36 outputs light with a light ray angle distribution whose peak is at a different angle from that of the light incident on optical adjuster 30.

In an embodiment, the second region 38 of the first optical adjuster 30 has a different transmissive characteristic than the first region 36 of the first optical adjuster 30. By varying the relative positioning of all three of the light output region 28 of the light guide 20, the first optical adjuster 30, and the second optical adjuster 60, the light output from the lighting assembly 10 is modifiable among a light output with a low and/or narrow ray angle distribution (e.g., light output by way of the first region 62 of the second optical adjuster 60), light output dependent on the optical characteristic of the first region 36 of the optical adjuster 30, and light output dependent on the optical characteristic of the second region 38 of the optical adjuster 30.

With reference to all of the figures, and FIG. 9 in particular, the light extracting elements of the light guide 20 can be configured to provide two light output regions 28 and 76, respectively, on the opposite major surfaces 22, 24 of the light guide 20. The light output regions 28 and 76 may be aligned with each other or may be offset relative to each other; the light output regions 28 and 76 may output light with the same light ray angle distribution or different light ray angle distributions. Additionally or alternatively, the light output regions 28 and 76 may output light with the same or different intensity profiles. Light output from the respective light output regions 28, 76 is independently modified by respective optical adjusters 30, 60 to provide light with characteristics suitable for illuminating respective illumination surfaces.

Returning to FIG. 1, additional details regarding the lighting assembly 10 when embodied as the light bulb 12 will be described. The light bulb 12 includes a base 78. The illustrated base 78 is an Edison base, but other types of bases 78 may be used, including any commercially-standard base or proprietary base used for mechanically securing an incandescent bulb, a fluorescent bulb, a compact fluorescent bulb (CFL), a halogen bulb, a high intensity discharge (HID) bulb, an arc lamp, or any other type of bulb into a lamp, a lighting fixture, a flashlight, a light bulb socket, etc., and/or for supplying electricity thereto. The light bulb 12 typically further includes a heat sink 80 that dissipates heat generated by the light sources 18. The heat sink 80 of the illustrated embodiment forms part of the housing 40. Parts of the light bulb 12, such as the light guide 20 and the optical adjuster 30, are described above with reference to FIGS. 3, 4, 5, 6A-6C, 7, 8A-8C and 9.

References herein to a "light bulb" are meant to broadly encompass light-producing devices that fit into and engage any of various fixtures for mechanically mounting the light-producing device and for providing electrical power thereto. Examples of such fixtures include, without limitation, screw-in fixtures for engaging an Edison light bulb base, a bayonet fixture for engaging a bayonet light bulb base, or a bi-pin fixture for engaging a bi-pin light bulb base. Thus the term "light bulb," by itself, does not provide any limitation on the shape of the light-producing device, or the mechanism by which light is produced from electric power. Also, the light bulb need not have an enclosed envelope forming an environment for light generation. The light bulb may conform to American National Standards Institute (ANSI) or other standards for electric lamps, but the light bulb does not necessarily have to have this conformance.

Returning to FIG. 2, additional details regarding the lighting fixture 14 will be described. The lighting fixture 14 may be a hanging light (as shown), a ceiling light (e.g., an assembly to fit in a drop-down ceiling or secure flush to a ceiling), a wall sconce, a table lamp, a task light, or any other illumination device. The lighting fixture includes the housing 59 for retaining the light source assembly 16, the light guide 20 and the optical adjuster 30. The housing 59 may retain or may serve as a heat sink. In some embodiments, the lighting fixture 14 includes a mechanism 82 (e.g., a chain or wire in the case of a hanging light, clips or fasteners in the case of a ceiling light or wall sconce, etc.) to mechanically secure the lighting assembly to a retaining structure (e.g., a ceiling, a wall, etc.). In other embodiments, the mechanism 82 is a stand and/or base assembly to allow the lighting fixture 14 to function as a floor lamp, table lamp, task lamp, etc. Electrical power is supplied to the lighting fixture through appropriate conductors, which in some cases may form part of or pass through the mechanism 82. Parts of the lighting fixture 14, such as the light guide 20 and the optical adjuster 30, are described above with reference to FIGS. 3, 4, 5, 6A-6C, 7, 8A-8C and 9.

In this disclosure, the phrase "one of" followed by a list is intended to mean the elements of the list in the alterative. For example, "one of A, B and C" means A or B or C. The phrase "at least one of followed by a list is intended to mean one or more of the elements of the list in the alterative. For example, "at least one of A, B and C" means A or B or C or (A and B) or (A and C) or (B and C) or (A and B and C).

What is claimed is:

1. A lighting assembly, comprising:
   a light guide comprising a solid and light transmissive medium having:
   opposed major surfaces between which light propagates by total internal reflection, the opposed major surfaces spaced apart in a thickness direction of the light guide;
   a light input edge, that extends in the thickness direction between the opposed major surfaces and having a surface area through which the light is incident and input into the light guide; and
   light extracting elements at at least one of the major surfaces of the light guide, the light extracting elements disrupt the total internal reflection of the propagating light in the light guide to output the light from the light guide via a light output region on one of the major surfaces of the light guide;
   a light source facing the light input edge to input the light into the light guide through the light input edge; and
   an optical adjuster having a major surface juxtaposed with and conforming to the major surface of the light guide, the major surface of the optical adjuster overlapping the light output region of the light guide, the optical adjuster having a first region at the major surface of the optical adjuster and a second region at the major surface of the optical adjuster, the first region having a light modifying characteristic different than a characteristic of the second region, the optical adjuster and light output region of the light guide variably positionable relative to one another such that an amount of overlap between the optical adjuster and the light output region remains the same, while respective amounts of overlap of the first region and the second region with the light output region are adjusted to selectively apportion light emitted from the light output region between the first region and the second region, the light apportioned to the first being modified by the light modifying characteristic thereof so that a characteristic of the light output from the lighting assembly is modified based on relative positioning of the optical adjuster and the light output region.

2. The lighting assembly of claim 1, wherein the light apportioned to the first region is emitted from the light output region in a first area of the light output region that is overlapped by the first region and the light apportioned to the second region is emitted from the light output region in a second area of the light output region that is overlapped by the second region, the amount of overlap of the first region and the second region with the light output region depending on the relative positioning of the optical adjuster and the light guide.

3. The lighting assembly of claim 1, wherein the first region, the second region and the light output region have the same size and shape.

4. The lighting assembly of claim 1, wherein the first region and the light output region have the same size and shape.

5. The lighting assembly of claim 1, wherein the characteristic of the light output from the lighting assembly that is modified is spectrum.

6. The lighting assembly of claim 1, wherein the characteristic of the light output from the lighting assembly that is modified is color temperature.

7. The lighting assembly of claim 1, wherein the characteristic of the light output from the lighting assembly that is modified is light ray angle distribution.

8. The lighting assembly of claim 1, further comprising a manually-operated mechanism to move at least one of the light guide and the optical adjuster relative to the other.

9. The lighting assembly of claim 1, further comprising a motorized mechanism to move at least one of the light guide and the optical adjuster relative to the other.

10. The lighting assembly of claim 1, wherein the light source is a solid-state light source.

11. The lighting assembly of claim 1, wherein the light extracting elements are light-scattering elements.

12. The lighting assembly of claim 1, wherein the light extracting elements have well-defined shapes.

13. The lighting assembly of claim 1, wherein the light extracting elements are micro-optical elements.

14. The lighting assembly of claim 1, wherein the light guide and the optical adjuster are planar.

15. The lighting assembly of claim 1, wherein the light guide is curved and the optical adjuster conforms to a curvature of the light guide.

16. The lighting assembly of claim 15, wherein the light guide and the optical adjuster are coaxial hollow cylinders.

17. The lighting assembly of claim 15, wherein the light guide and the optical adjuster are hollow, frustroconical and coaxial.

18. The lighting assembly of claim 1, wherein the second region is reflective to reflect light incident on the second region back through the light guide.

19. The lighting assembly of claim 18, further comprising a diffusive optical component adjacent the light guide on a side of the light guide opposite the optical adjuster to diffuse the reflected light.

20. The lighting assembly of claim 18, additionally comprising an optical component on which the reflected light that exits the light guide is incident, the optical component being at least one of light redirecting, polarizing, reflective polarizing, intensity reducing, wavelength shifting and color attenuating.

21. The lighting assembly of claim 1, wherein the lighting assembly further comprises an additional optical adjuster having a major surface juxtaposed with and conforming to the other of the major surfaces of the light guide, the additional optical adjuster having a first region and a second region, the first region of the additional optical adjuster having a light modifying characteristic, the additional optical adjuster and light guide variably positionable relative to one another to selectively apportion light output by the light guide and incident on additional optical adjuster between the first region of the additional optical adjuster and the second region of the additional optical adjuster, light apportioned to the first region of the additional optical adjuster being modified by the light modifying characteristic thereof so that a characteristic of the light output from the lighting assembly is also modified based on relative positioning of the additional optical adjuster and the light guide.

22. The lighting assembly of claim 21, wherein the light guide additionally comprises a second light output region on the second major surface.

23. The lighting assembly of claim 21, wherein the relative positioning of the additional optical adjuster and the light guide is independent of the relative positioning of the optical adjuster and the light guide.

24. The lighting assembly of claim 1, wherein the optical modifying characteristic of the first region is at least one of reflective, diffusive, light redirecting, polarizing, reflective polarizing, intensity reducing, wavelength shifting and color attenuating.

25. The lighting assembly of claim 24, wherein the second region is specularly transmissive or has an optical modifying characteristic different than the first region and that is at least one of reflective, diffusive, light redirecting, polarizing, reflective polarizing, intensity reducing, wavelength shifting and color attenuating.

26. The lighting assembly of claim 1, wherein the first region is diffusive, and the second region is specularly transmissive or light redirecting.

27. The lighting assembly of claim 1, wherein the first region is reflective, and the second region is specularly transmissive or light redirecting.

28. The lighting assembly of claim 1, wherein the first region is reflective and the second region is diffusive.

29. The lighting assembly of claim 1, wherein the optical adjuster and light output region of the light guide are variably positionable relative to one another between a first position where the output region is overlapped with the first region of the optical adjuster and is not overlapped with the second region of the optical adjuster, a second position where the output region is overlapped with the second region of the optical adjuster and is not overlapped with the first region of the optical adjuster, and a third position where a portion of the output region is overlapped with the first region of the optical adjuster and another portion of the output region is overlapped with the second region of the optical adjuster.

30. The lighting assembly of claim 1, wherein a position of the first region of the optical adjuster is fixed relative to a position of the second region of the optical adjuster.

31. The lighting assembly of claim 1, wherein the optical adjuster and the light output region of the light guide variably positionable relative to one another to adjust a ratio of an overlap of the first region with the light output region to an overlap of the second region with the light output region.

32. The lighting assembly of claim 1, wherein the light guide further comprises:
  a distal edge opposite the light input edge in a length direction of the light guide and extends in the thickness direction between the opposed major surfaces; and
  opposed side edges that are spaced apart in a width direction of the light guide that extend in the thickness direction between the opposed major surfaces, each opposed side edge connecting the light edge and the distal edge.

* * * * *